United States Patent [19]

Honma et al.

[11] 4,361,830

[45] Nov. 30, 1982

[54] DEVICE FOR DISPLAYING FEATURE OF CONTOUR IMAGE

[75] Inventors: Kazuhiro Honma, Tokyo; Kajuro Shimizu, Miyoshi; Tetsu Nakatani, Higashimurayama; Eiichi Takenaka, Tokyo, all of Japan

[73] Assignees: Agency of Industrial Science & Technology; Ministry of International Trade & Industry, both of Tokyo, Japan

[21] Appl. No.: 185,775

[22] Filed: Sep. 10, 1980

[30] Foreign Application Priority Data

Sep. 10, 1979 [JP] Japan ................................. 54-115921

[51] Int. Cl.³ ............................................. G06K 9/48
[52] U.S. Cl. ................. 340/146.3 AC; 340/146.3 AE; 358/107
[58] Field of Search ........... 340/146.3 AE, 146.3 AC, 340/146.3 H, 146.3 Y, 146.3 R; 235/92 PC; 364/413, 515; 358/96, 101, 107; 356/39; 250/202

[56] References Cited

U.S. PATENT DOCUMENTS

| | | | |
|---|---|---|---|
| 2,838,602 | 6/1958 | Sprick | 340/146.3 R |
| 3,112,468 | 11/1963 | Kamentsky | 340/146.3 Y |
| 3,748,644 | 7/1973 | Tisdale | 340/146.3 H |
| 3,987,412 | 10/1976 | Morrin | 340/146.3 AE |
| 4,156,231 | 5/1979 | Edamatsu et al. | 340/146.3 H |
| 4,163,214 | 7/1979 | Komori et al. | 340/146.3 Y |
| 4,179,684 | 12/1979 | Cheng | 364/515 |

*Primary Examiner*—Leo H. Boudreau
*Attorney, Agent, or Firm*—Oblon, Fisher, Spivak, McClelland & Maier

[57] ABSTRACT

The x-y coordinates are determined of a multiplicity of points set at very small intervals of a fixed value on a contour line, the coordinates of a selected number of points on either side of one (central point) of the aforementioned multiplicity of points are averaged, the two points corresponding to the two sets of averaged coordinates are connected by a straight line, a perpendicular line is drawn to this straight line from the aforementioned central point, and the distance from the central point to the foot of the perpendicular line on the straight line is calculated. This distance varies with the change in the shape of the contour line. By finding this distance with respect to each of the points on the contour line and displaying the distances found, there can be obtained a figure indicative of features of the shape of the contour image.

4 Claims, 29 Drawing Figures

Fig_1

Fig_2

Fig_3

Fig_4

DEVICE FOR DISPLAYING FEATURE OF CONTOUR IMAGE

BACKGROUND OF THE INVENTION

This invention relates to a device for extracting and displaying features of a contour image, and more particularly to a device for extraction of features of a contour image which functions effectively such as in the automatic diagnosis of morbid regions in the human liver, for example, by permitting extraction of hepatic deformations due to disease from the contour of the radioisotope image of the liver.

Extraction of features such as bends, curves, recesses and protuberances from the contour of an image constitutes one important measure for the recognition of the shape of an article under examination.

Heretofore, it has been customary to detect variation of a given contour image from the standard image of its kind by successively measuring curvatures of fine segments of the contour and comparing the found values with the standard values. The methods heretofore employed for the pattern recognition are invariably complicated. (For example, T. Pavlidis et al. "Segmentation of Plane Curves" IEEE. Trans. vol. C-23, No. 8, p. 860-870 (1974), A. Rosenfeld et al. "Angle Detection on Digital Curves" IEEE. Trans. vol. C-22, No. 9, p. 875-878, (1973), S. D. Shapiro "Transform Method of Curve Detection for Textured Image Data" IEEE. Trans. vol. C-27, No. 3, p. 254-255 (1978), T. Pavlidis "The Use of a Syntactic Shape Analyzer for Contour Matching" IEEE. Trans. vol. PAMI-1, No. 3 p. 307-310, (1979), J. W. Mckee, et al. "Computer Recognition of Partial Views of Curved Objects" IEEE. Trans. vol. C-26, No. 8, p. 790-800 (1977), R. Jain et al. "Computer Analysis of Scenes with Curved Objects" Proc. IEEE. vol. 67, No. 5, p. 805-812 (1979)).

SUMMARY OF THE INVENTION

An object of this invention is to provide a device for the extraction of features of a given contour image, which is capable of easily and quantitatively extracting and displaying features of the given contour image based on the shape thereof.

Another object of this invention is to provide a device for the extraction of features of a given contour image, which is capable of displaying the amount of variation at a specific position of the contour image.

To accomplish the objects described above according to the present invention, there is provided a device for the extraction of features of the contour image, which comprises means for setting a multiplicity of points at very small intervals on the contour image, means for determining the x and y coordinates of such points, means for determining the averages of the x coordinates and the y coordinates of a stated number of consecutive points on either side of a point selected from among the aforementioned multiplicity of points, means for drawing a perpendicular line from the aforementioned one point of the contour image to the line connecting the two points represented by the averaged coordinates and means for measuring the distance from the one point to the point at which the perpendicular line intersects the aforementioned line. This distance varies with the shape of the outline, namely, the contour line, of the image. By repeating the steps by use of the aforementioned series of means, this distance is found for each of the multiplicity of points on the contour image and all the distances thus found are displayed. Consequently, features of the contour image according to its shape are obtained.

As described above, a multiplicity of straight lines representing the magnitudes corresponding to the shape of the contour image are obtained as the output by this invention. In the case of two apparently similar images, when their respective outputs obtained as described above are displayed, the feature diagrams thus displayed conspicuously show the differences between the two images.

The other objects and characteristics of the present invention will become apparent from the further disclosure of the invention to be made hereinafter with reference to the accompanying drawing.

BRIEF EXPLANATION OF THE DRAWING

FIG. 7(A), FIG. 8(A) and FIG. 9(A) representing the features obtained by displaying the average coordinates of adjacent one points and FIG. 7(B), FIG. 8(B) and FIG. 9(B) representing the features obtained by displaying the average coordinates of a total of ten points.

FIGS. 12(A), (B) and (C) are explanatory diagrams illustrating the procedure for setting a multiplicity of points at very small intervals on the contour line by use of a television camera and determining the coordinates of the individual points.

FIG. 14 illustrates diagrams of extracted features obtained by processing the contour image of the human liver by the device of this invention:

FIG. 16 illustrates extracted features obtained by fixing three slits in the contour image of the liver and processing the coordinates of the slits by the device of this invention:

FIG. 17 illustrates extracted features obtained by setting three dents in the contour image of the liver of FIG. 14 and processing the coordinates thereof by the device of this invention:

DESCRIPTION OF PREFERRED EMBODIMENT

The contour images subjected to the processing by the present invention may be drawn by any conceivable method. Examples of methods available for the formation of such contour images include a method which forms the contour of an image from video signals obtained with a I.T.V. camera, a method which resorts to differential processing method by use of gradient and Laplacian operator, a pattern matching method which involves calculation of the correlation coefficient of a given figure with reference to the standard mask, a method which divides a given image plane into zones of varying nature depending on distribution of intensity, a method which utilizes the results of filtering in the plane of transformed train such as by Fourier transform and a method of double slicing proposed by the inventors (Japanese Published Unexamined Patent Application No. 49778/1980). The term "contour image" as used in the specification of this invention is meant to describe the contour line which forms the outline of the image in question. It is not limited to images which are composed solely of contour lines.

In preparation for the description of the device of this invention for the extraction of features of contour images, the fundamental principle of this invention will be described with reference to FIGS. 1-13.

Figure 1:
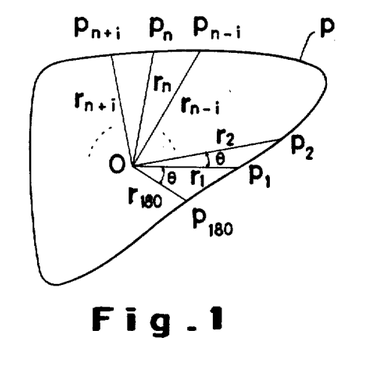
FIG. 1 is an explanatory diagram of one embodiment of the means for setting a multiplicity of points on a contour line subjected to the operation by use of the device of this invention.

FIG. 1 illustrates a contour image P drawn by a suitable method. From a point 0 freely chosen within the contour image, straight lines are radially extended at fixed angular intervals $\theta$ of, say, 2° and the distances $r_1$, $r_2, \ldots r_{n-i}, r_n, \ldots r_{n+i}, \ldots r_{180}$, from the aforementioned fixed point 0 to the points $P_1, P_2, \ldots P_{n-i}, \ldots P_n, \ldots P_{n+i}, \ldots P_{180}$ at which the aforementioned straight lines intersect the contour line outlining the contour image are successively measured.

Figure 2:
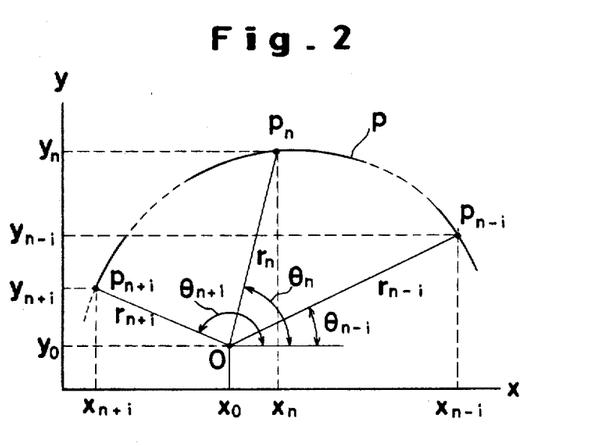
FIG. 2 is an explanatory diagram of the means for converting the points set on the contour line into coordinates in a rectangular coordinate system.

Then, the fixed point 0 and the aforementioned points $P_1, P_2, \ldots P_{n-i}, P_n, \ldots P_{n+i}, \ldots$ on the contour line are converted into their respective x-y coordinates as illustrated in FIG. 2. Let $\theta_{n-i}, \theta_n$ and $\theta_{n+i}$ stand for the angles to be formed by the straight lines connecting the fixed point 0 to the points of intersection $P_{n-i}, P_n$ and $P_{n+i}$, with reference to the reference axis, and the coordinates of the fixed point 0 and the points of intersection $P_{n-i}, P_n$ and $P_{n+i}$ will be expressed as follows.

$$O(x_0, y_0) \tag{1}$$

$$P_{n-i}(x_{n-i}, y_{n-i}) \tag{2}$$

wherein, $$\begin{cases} x_{n-i} = r_{n-i} \cos \theta_{n-i} + x_0 \\ y_{n-i} = r_{n-i} \sin \theta_{n-i} + y_0 \end{cases} \tag{3}$$

$$P_n(x_n, y_n)$$

wherein, $$\begin{cases} x_n = r_n \cos \theta_n + x_0 \\ y_n = r_n \sin \theta_n + y_0 \end{cases}$$

$$P_{n+i}(x_{n+i}, y_{n+i}) \tag{4}$$

wherein, $$\begin{cases} x_{n+i} = r_{n+i} \cos \theta_{n+i} + x_0 \\ y_{n+i} = r_{n+i} \sin \theta_{n+i} + y_0 \end{cases}$$

Figure 3:
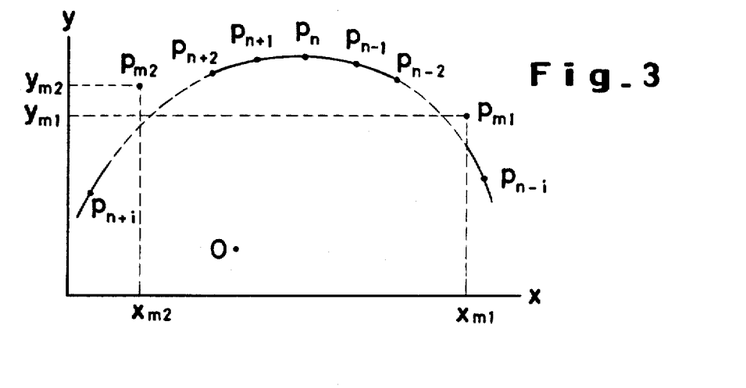
FIG. 3 and FIG. 4 are explanatory diagrams of the principle of the extraction of features of a contour line according to the present invention.

Subsequently, with respect to a given number (i) of consecutive points of intersection up to $P_{n-i}$ and $P_{n+i}$ on either side of a selected point of intersection $P_n(x_n, y_n)$, the averages $P_{m1}$ and $P_{m2}$ are determined (FIG. 3). Let N stand for the total number of points of intersection from $P_{n-1}$ to $P_{n-i}$ or from $P_{n+1}$ to $P_{n+i}$, then the average $P_{m1}$ and $P_{m2}$ will be expressed as follows:

$$P_{m1}(x_{m1}, y_{m1}) \tag{5}$$

wherein, $$\begin{cases} x_{m1} = \frac{1}{N} \sum_{i=1}^{N} x_{n-i} \\ y_{m1} = \frac{1}{N} \sum_{i=1}^{N} y_{n-i} \end{cases}$$

$$P_{m2}(x_{m2}, y_{m2}) \tag{6}$$

wherein, $$\begin{cases} x_{m2} = \frac{1}{N} \sum_{i=1}^{N} x_{n+i} \\ y_{m2} = \frac{1}{N} \sum_{i=1}^{N} y_{n+i} \end{cases}$$

Figure 4:
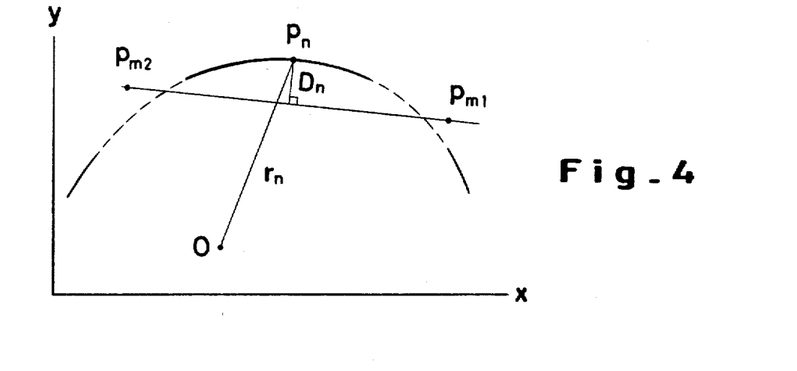

Draw a perpendicular line from a central point of intersection $P_n$, as illustrated in FIG. 4, to the straight line connecting the points represented by the aforementioned two averages $P_{m1}$ and $P_{m2}$, and the distance $D_n$ from the point $P_n$ to the point at which the perpendicular line intersects the aforementioned straight line will be determined in accordance with the following formula.

$$|D_n| = \left| \frac{\left(\frac{y_{m2} - y_{m1}}{x_{m2} - x_{m1}}\right)(x_{m1} - x_n) + y_n - y_{m1}}{\sqrt{\left(\frac{y_{m2} - y_{m1}}{x_{m2} - x_{m1}}\right)^2 + 1}} \right| \tag{7}$$

-continued $$(n = 1, 2, \ldots, 180)$$

The absolute value of this distance, $|D_n|$, is largely affected by the total number of points of intersection where the contour line contains sharp rises and falls.

When the straight lines extended radially from the fixed point within the contour image involve a fixed angular interval of 2°, there occur a total of 180 points of intersection. The distances, from the fixed point to these points of intersection are successively determined. This distance $|D_n|$ varies with the change in the shape of the contour involved. In the specification of this invention, this distance $D_n$ is defined as the variate.

By substituting the formulas (2) through (6) in the aforementioned formula (7), the distance $|D_n|$ can be expressed without including the $x_0$ and $y_0$ terms. This fact indicates that the point 0 ($x_0$, $y_0$) may be any point within the contour image.

Figure 5:
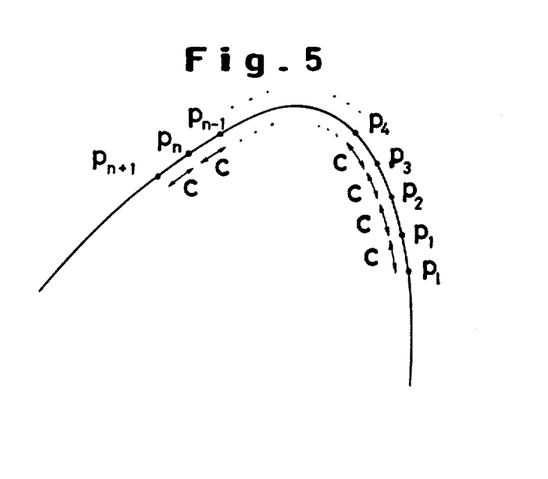
FIG. 5 and FIG. 6 are explanatory diagrams of another embodiment of the means for setting a multiplicity of points on a contour line subjected to the operation by use of the device of this invention.
Figure 6:
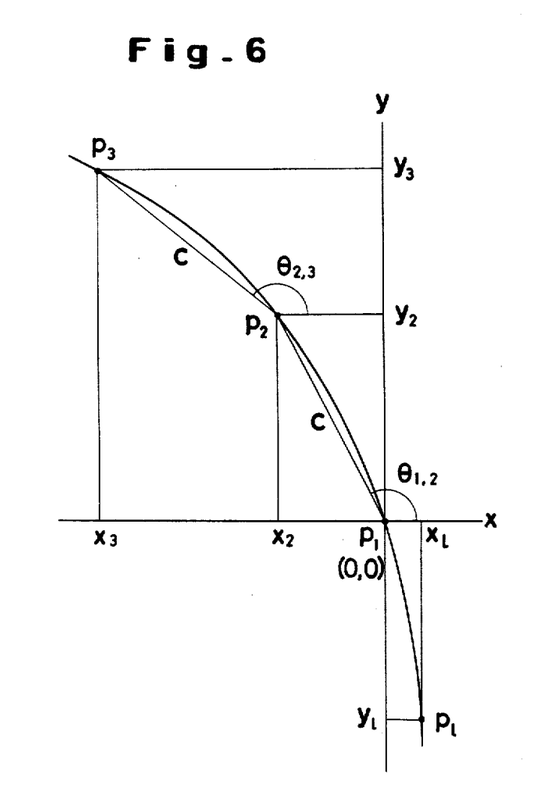

In the preceding description, the point $P_n$ on the contour line has been defined as the point at which the relevant one of the straight lines radially extended at a fixed angular interval from the fixed point 0. Such point may otherwise be obtained by the following method. As illustrated in FIG. 5, one point $P_1$ (0, 0) is randomly fixed on the contour line of a given image and points $P_n$ (n=1, 2, ... n−1, n, n+1, ... l) separated incrementally from the point $P_1$ at a fixed, very small interval C are consecutively taken on the contour line. On condition that the point $P_1$ forms the origin of the rectangular coordinate system and the angles which the straight lines connecting this origin to the points $P_n$ and $P_{n+1}$ form with the x axis are expressed respectively as $\theta_n$, $\theta_{n+1}$, the x and y components of the coordinates of the individual points $P_1, \ldots P_{n-i}, \ldots, P_{n-1}, P_n, P_{n+1}, \ldots P_{n+i}, \ldots P_l$ are expressed as follows. (Refer to FIG. 6.)

$$P_1(0, 0) \tag{8}$$
$$P_2(x_2, y_2) \tag{9}$$
wherein, $$\begin{cases} x_2 = C \cos \theta_{1,2} \\ y_2 = C \sin \theta_{1,2} \end{cases}$$

$$P_3(x_3, y_3) \tag{10}$$
wherein, $$\begin{cases} x_3 = C \cos \theta_{2,3} + x_2 \\ y_3 = C \sin \theta_{2,3} + y_2 \end{cases}$$

$$P_n(x_n, y_n) \tag{11}$$
wherein, $$\begin{cases} x_n = C \cos \theta_{n-1, n} + x_{n-1} \\ y_n = C \sin \theta_{n-1, n} + y_{n-1} \end{cases}$$

In the distribution of the points $P_n$ on the contour line, when this contour line relatively approximates a circle, it is a simple job to fix such points $P_n$ at substantially fixed intervals on the contour line by adopting the method of FIG. 1.

Where the contour image has a complicated shape containing sharp rises and falls, the distribution of the points can be effected more advantageously by the method of FIGS. 5 and 6.

Figure 7:
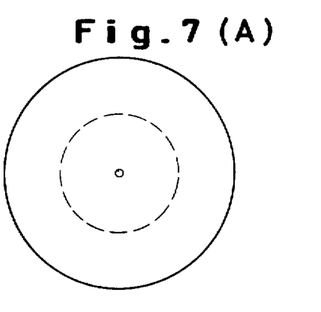
FIGS. 7, 8 and 9 are feature diagrams of the test patterns of circle, octadecagon and tetragon respectively obtained by use of the device of this invention for the extraction of features of a contour line.
Figure 8:
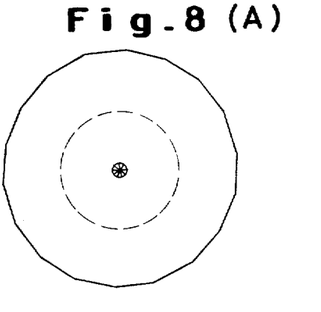
Figure 9:
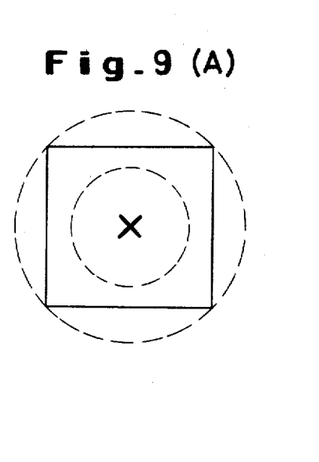

FIGS. 7, 8 and 9 are feature diagrams obtained by processing the pattern figures of a circle, octadecagon and square respectively by the device of this invention. In each figure, the center is used as the origin of the rectangular coordinate system, straight lines are radially extended from this origin at a fixed angular interval of 2° and the x and y coordinates of the points at which the straight lines inersect the contour line are determined. FIGS. 7(A), 8(A) and 9(A) represent the results of the processing which uses 1 as the value of N, namely the averages $P_{m1}$ and $P_{m2}$ for the opposite ends of points fixed on the contour line, and FIGS. 7(B), 8(B) and 9(B) represent the results of the processing which uses 10 as the value of N, namely the averages $P_{m1}$ and $P_{m2}$ for ten sets of the opposite ends of points fixed on the contour line. For convenience of reference, in these diagrams, there are indicated the respective original contour figures and the radially extended straight lines representing the output variates $|D_n|$ of the various positions. The leading ends of these straight lines are connected consecutively with a continuous line.

Then, the maximum value of the distance $r_n$ from the fixed point 0 is normalized and the distance $|D_n|$ is calculated from the formula (7) and this distance is indicated. The external circle drawn with a dotted line has, as its radius, the maximum value of the distance from the origin in the relevant input image, while the internal circle drawn with a dotted line has, as its radius, one half of the radius of the external circle. They are indicated to aid in the study of the diagrams. Here, for the purpose of enabling the variates to assume the absolute values of $|D_n|$ invariably in the positive, the protuberances and recesses of the contour lines are quantitatively given outside of the origin.

In FIG. 7(A), at the center of the circle, there is drawn a small circle. Actually, this small circle represents 180 straight lines radially extended from the center. When the value of N is taken to be 10, 180 straight lines much longer than those of FIG. 7(A) are radially extended as illustrated in FIG. 7(B). By connecting the leading ends of the adjacent straight lines, there is obtained a substantially circular outline. In the case of the pattern figure of an octadecagon, the feature diagram assumes the shape of a star having 18 apexes. While the original circular and octadecagonal figures are hardly discriminable on cursory observation, their feature patterns displayed in the form of variates are clearly discriminable as shown in the diagram. Also in the case of the pattern figure of a square shown in FIG. 9, when the value of N is taken to be 1, a small cross is indicated as an aggregate of variates at the center. When the value is taken to be 10, the variates of the square are displayed in a hugely enlarged form.

So far the method for the extraction of features of a given contour image has been described in detail. Now, the device to be used for working this method will be described with reference to FIGS. 10–13.

Figure 10:
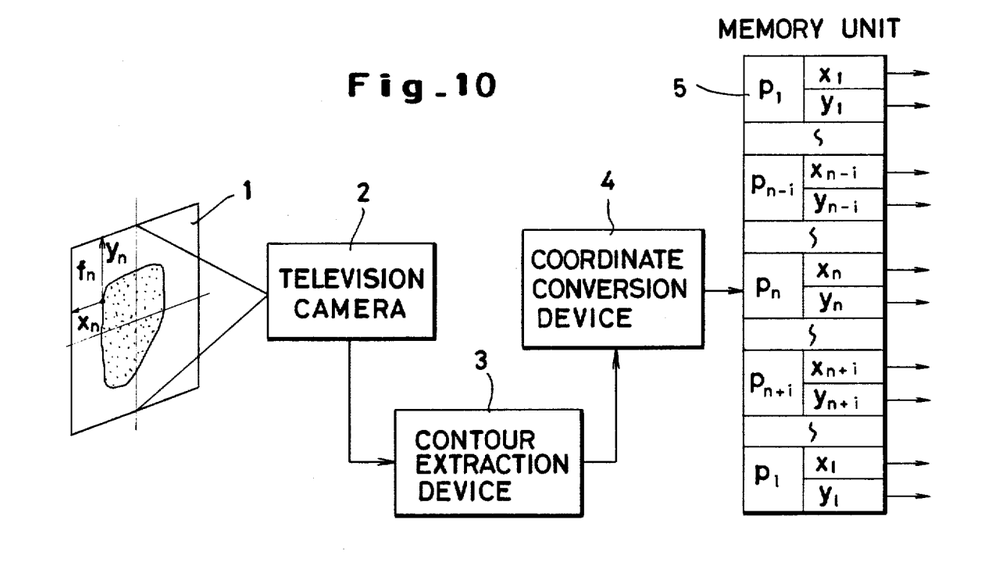
FIG. 10 is a block diagram illustrating the steps involved between the time the contour image is detected and the time the values of the x-y coordinates of the multiplicity of points on the contour line are recorded by the device of the present invention.

Referring to FIG. 10, an image 1 subjected to the processing by this invention is detected by a television camera 2 and contour extraction device 3 connected to the television camera 2 draws a contour image based on the output of the television camera 2. The television camera and the shape extraction device which participate in the formation of the contour image may be any of those devices well known to the art.

Coordinate conversion device 4 functions in response to the output signal from the contour extraction device 3. When the television camera is used as detective means as described above, the x coordinate $x'_n$ of each of the multiplicity of points $f_n$ set at a fixed, very small interval on the contour image is given in terms of the time interval from the horizontal synchronizing signal to the image signal corresponding to the point $f_n$ and the y coordinate $y'_n$ of the point $f_n$ is given in terms of the number of scanning lines up to the point $f_n$. When the coordinates of the multiplicity of points on the contour image are determined as described above, the distances between the adjacent points on the contour image are not necessarily constant because, for example, of variation in the inclination of the line. To render the distances constant, the coordinate version with respect to the point $P_n$ is carried out as follows.

In the coordinate conversion means, on the basis of the coordinates of the multiplicity of points $f_n$ on the contour image line which have been determined as described above (FIG. 12(A)), the points are consecutively connected with straight lines (FIG. 12(B)). Now, to set points $P_n$ at a freely selected, fixed interval C, a point $P_{n-3}$ is set at the fixed interval C on the approximate straight line from the point $f_{n-3}$ and then another point $P_{n-2}$ is set at the fixed interval C from the point $P_{n-3}$ and the following points $P_{n-1}, P_n, \ldots$ are similarly set successively until the whole contour line is covered. Consequently, the coordinates of the multiplicity of points $f_n$ orginally given on the contour image are converted into those of the multiplicity of points $P_n$ separated by the fixed, very small interval C. It should be noted that such conversion of coordinates can be easily carried out by processing with an electronic computer.

The values of the rectangular coordinates of the points $P_n$ extracted from the coordinate conversion device 4 as described above are sequentially stored in memory unit 5. Thereafter, the stored values are successively delivered to arithmetic means to undergo calculations based on the formulas (5)–(7).

Figure 11:
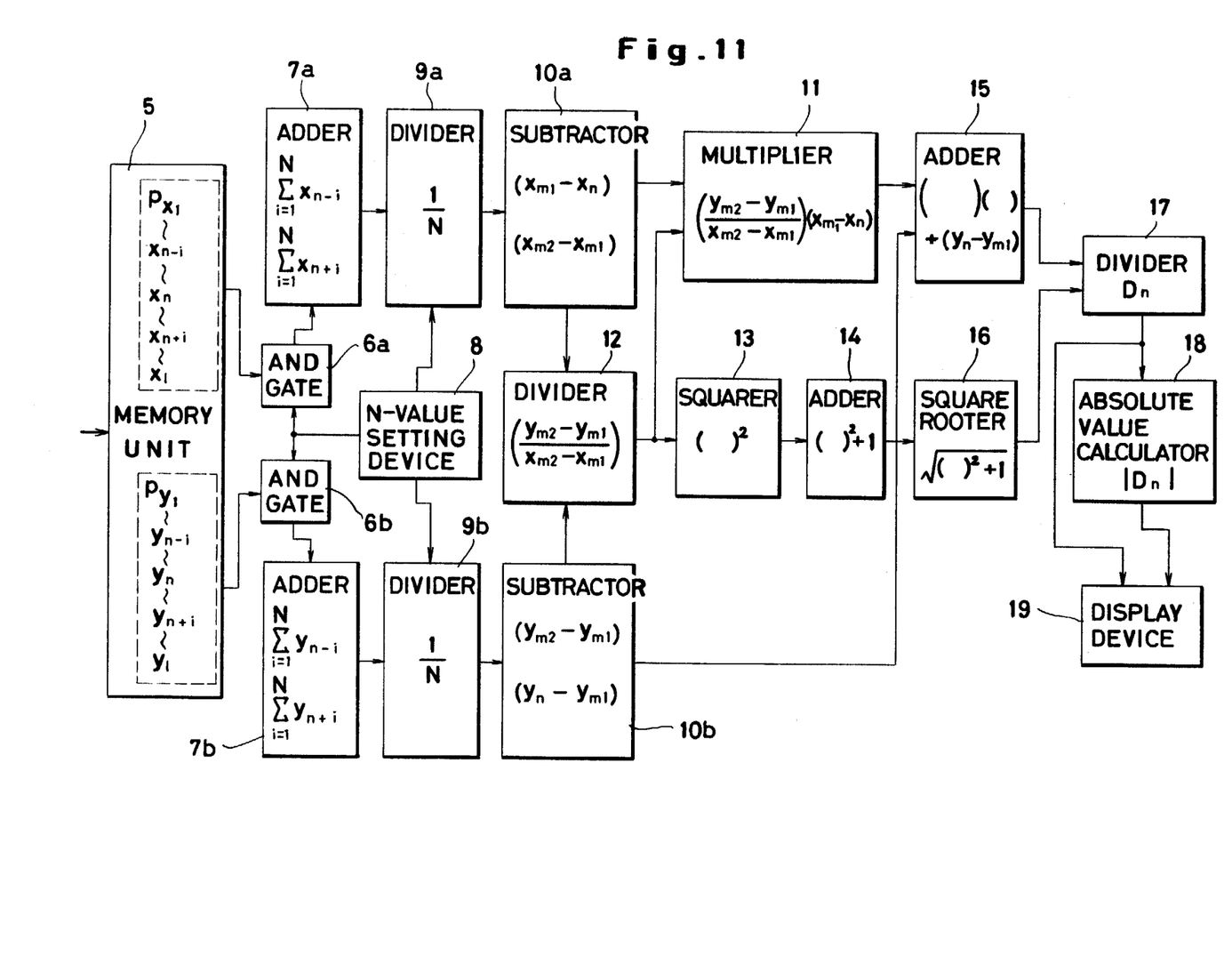
FIG. 11 is a block diagram illustrating the steps involved up to the time the features of the contour image extracted on the basis of the recorded coordinates of the multiplicity of points by the device of this invention.
Figure 12:
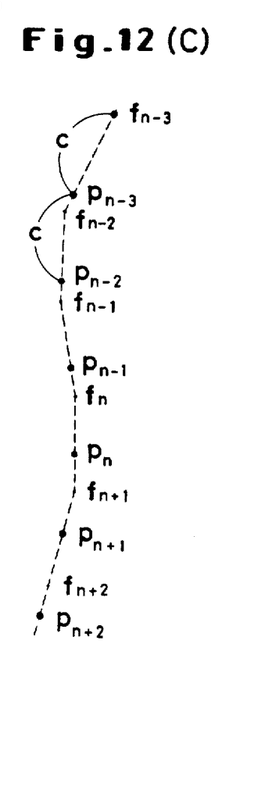
Figure 13:
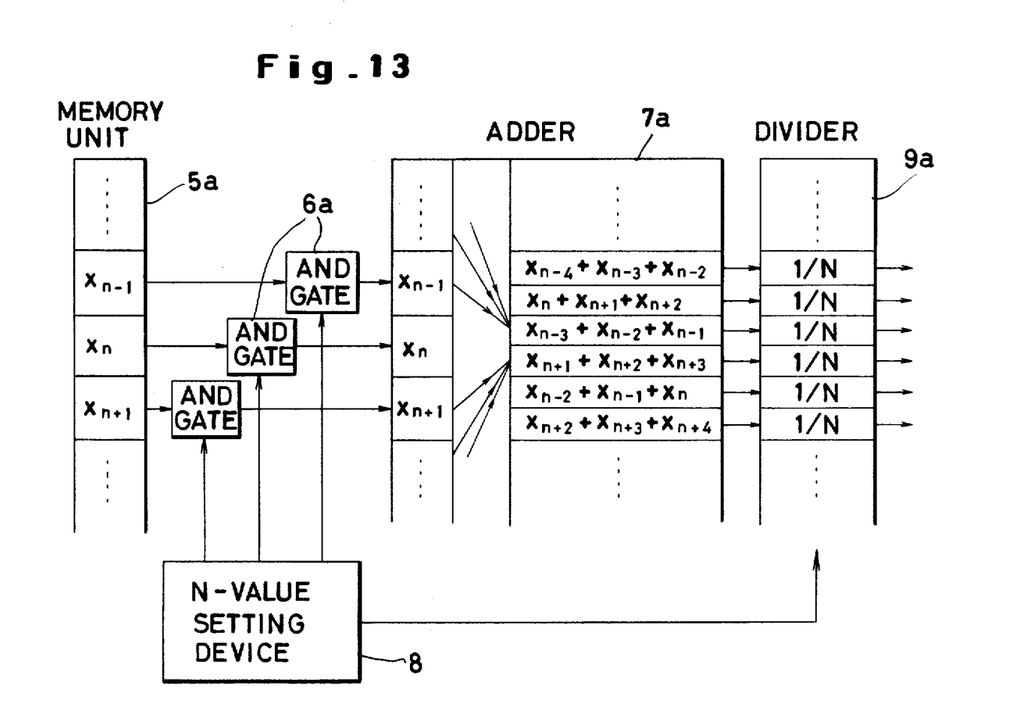
FIG. 13 is a block diagram of the means for processing the output from the means for recording the coordinates in the device of FIG. 11.

FIG. 11 illustrates the construction of the afore-mentioned arithmetic means. This arithmetic means is first provided with adders 7a, 7b which are adapted to add the x components and y components of the coordinates of N points on each side of the point $P_n$ so as to determine the coordinates of the points $P_{m1}$ and $P_{m2}$ in accordance with the formulas (5) and (6) on the basis of the x coordinate and y coordinate of the point $P_n$ as stored in the memory unit 5. The setting of the value of N mentioned above is accomplished by N-value setting device 8 which permits free external selection of this value. The addition of the values of the coordinates at N points by the adders 7a, 7b is effected by causing the aforementioned values of coordinates of N points on either side of the point $P_n$ to be forwarded to the adder 7a via the AND gate 6a which is controlled by the output from the N-value setting device 8 as illustrated in FIG. 13. FIG. 13 illustrates an embodiment of the arithmetic operation of x coordinates, with the value of N fixed at 3. The addition of the coordinates of the point $P_n$ is followed by the addition of the coordinates of the subsequent point $P_{n+1}$ which is carried out by the same procedure. The arithmetic operation on the y coordinates is similarly effected in the adder 7b.

The dividers 9a, 9b which are connected to the adders 7a, 7b serve the purpose of dividing the outputs of the adders by the divisor N in accordance with the formulas (5) and (6). Namely, they divide the outputs of the adders 7a, 7b by the value of N received from the N-value setting device 8. In consequence of this division, the dividers 9a, 9b deliver the coordinates $x_{m1}$, $x_{m2}$, $y_{m1}$ and $y_{m2}$ of the aforementioned points $P_{m1}$ and $P_{m2}$ with respect to the point $P_n$ under observation.

The subtractor 10a which is connected to the divider 9a subtracts $x_n$ stored in the memory unit 5 from $x_{m1}$ delivered from the divider 9a and, at the same time, subtracts the same value $x_{m1}$ from $x_{m2}$ delivered from the divider 9a, with the difference of $(x_{m1}-x_n)$ forwarded to the multiplier 11 and the difference of $(x_{m2}-x_{m1})$ to the divider 12 respectively as the outputs. In the meantime, the subtractor 10b which is connected to the divider 9b subtracts $y_{m1}$ from $y_{m2}$ deliverd from the aforementioned divider 9b and, at the same time, subtracts $y_{m1}$ delivered from the divider from $y_n$ stored in the memory unit 5, with the difference of $(y_{m2}-y_{m1})$ forwarded to the divider 12 and the difference of $(y_n-y_{m1})$ to the adder 15 respectively. The divider 12 performs the division of $(y_{m2}-y_{m1})/(x_{m2}-x_{m1})$ based on the output signals from the subtractors 10a, 10b and forwards the resultant output to the multiplier 11 and the squarer 13. The multiplier 11 multiplies the output signal from the subtractor 10a by the output signal from the divider 12 and forwards the resultant output signal to the adder 15. The adder 15 adds the output signal $(y_n-y_{m1})$ from the subtractor 10b to the output signal from the multiplier 11 and forwards the resultant output signal to the divider 17. In the meantime, the squarer 13 squares the output signal from the divider 12 and forwards the resultant output signal to the adder 14, there to be increased by 1. The output signal of the adder 14 is forwarded to the square rooter 16, where its square root is derived. The resultant output signal from the square rooter 16 is forwarded to the divider 17. The output signal from the adder 15 corresponds to the numerator of the formula (7) and the output signal from the square rooter 16 to the denominator of the same formula. Consequently, the value of $D_n$ is obtained by having the output signal from the adder 15 divided by the output signal from the square rooter 16 in the divider 17. Then, the value of $D_n$ is converted into the absolute value $|D_n|$ in the absolute value calculator 18.

When the variate $|D_n|$, namely the output of the absolute value calculator obtained as described above, is forwarded to a suitable display device 19 such as, for example, a cathode ray tube or auto-drafter, it can be displayed all by itself or in conjunction with the contour image as illustrated in FIGS. 7–9. Where protuberances and recesses in the contour images necessitate discrimination, the discrimination can be obtained by having the output signal $D_n$ displayed.

Concrete examples of devices usable for displaying the output signal $D_n$ include a graphic display, a cathode ray tube and a line printer, which display $D_n$ in the form of numerical values at the corresponding position on the contour image.

FIG. 14 illustrates contour images obtained by processing the radioisotope image of a normal liver by the double slicing method proposed by the present inventors: FIGS. 14(A), (B), (C), (D), (E) and (F) representing feature diagrams of variates displayed in consequence of the processing by the present invention, using 1, 3, 5, 10, 15 and 20 respectively as the value of N.

It is noted from the diagrams that the values of variates are gradually increased in proportion as the value of N is increased even where curvatures of contour are small.

Figure 14A:
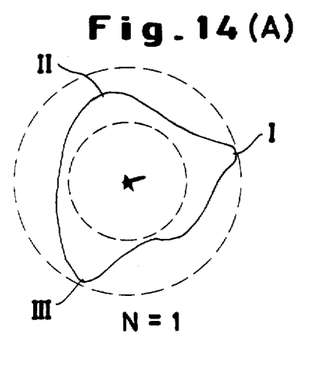
FIG. 14(A) representing the case involving the average coordinates of one point on either side of the selected point, FIG. 14(B) the case involving the average coordinates of three points, FIG. 14(C) the case involving the average coordinates of five points, FIG. 14(D) the case involving the average coordinates of ten points, FIG. 14(E) the case involving the average coordinates of 15 points and FIG. 14(F) the case involving the average coordinates of 20 points respectively.
Figure 14B:
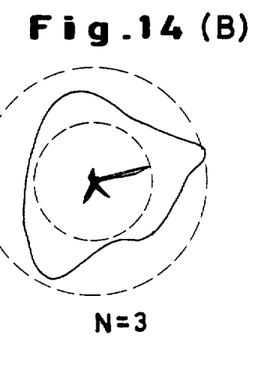
Figure 14C:
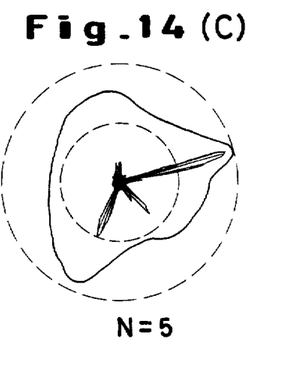
Figure 14D:
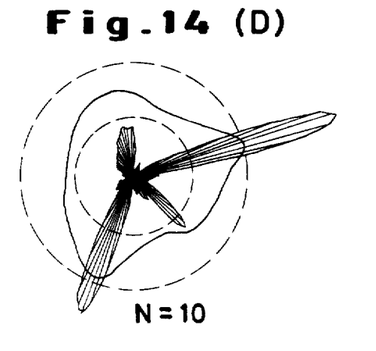
Figure 14E:
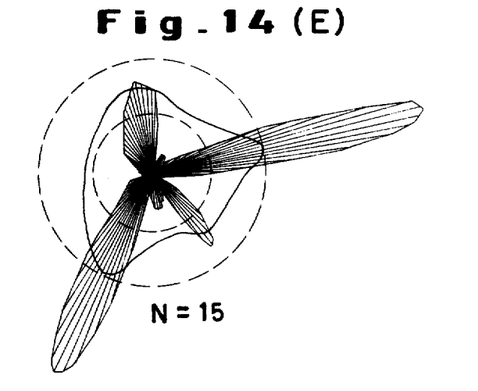
Figure 14F:
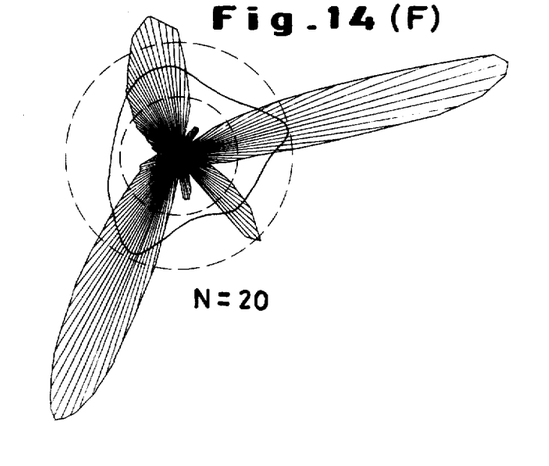
Figure 15:
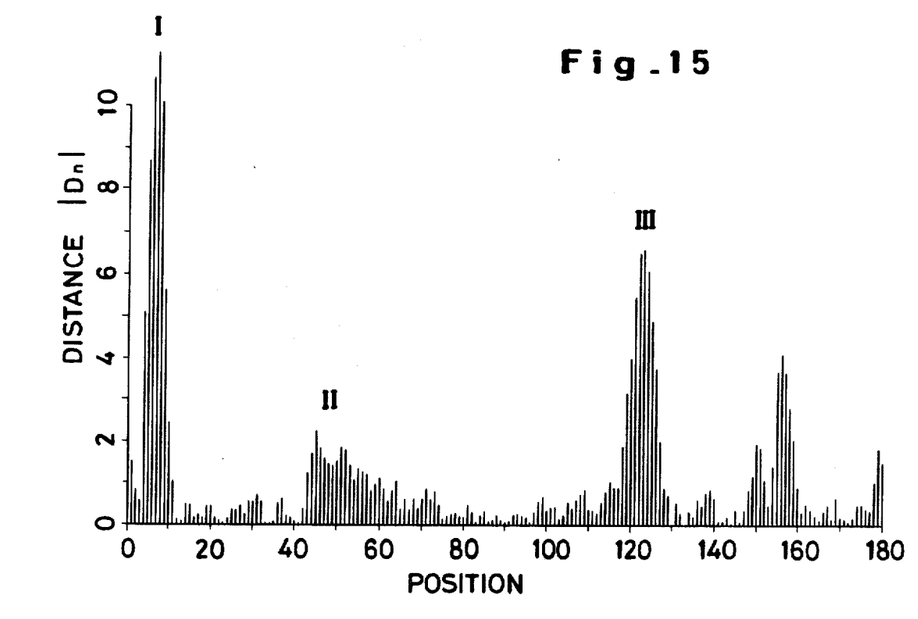
FIG. 15 is a graph showing the extracted features obtained by another processing of the contour image of the human liver according to the device of this invention.

FIG. 15 is a bar graph wherein the variates $|D_n|$ obtained (with the value of N fixed at 6) by radially extending lines from one point within the contour image of the liver of FIG. 14 at a fixed angular interval of 2° and determining the coordinates at the 180 points of intersection between the straight lines and the contour line are displayed by bars of corresponding lengths. In the graph, the peaks I, II and III correspond to the three portions of large curvature in the contour line of the liver in FIG. 14(A). When the variates are graphically displayed in the form of bars as described above, possible changes from the standard contour figure of the normal liver can easily be detected by comparing the displayed bars with the standard bars.

Figure 16A:
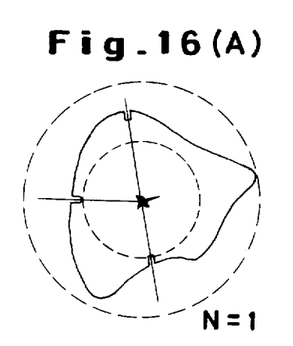
FIG. 16(A) representing the case involving the average coordinates of one point on either side of the selected point and FIG. 16(B) the case involving average coordinates of 10 points, respectively.
Figure 16B:
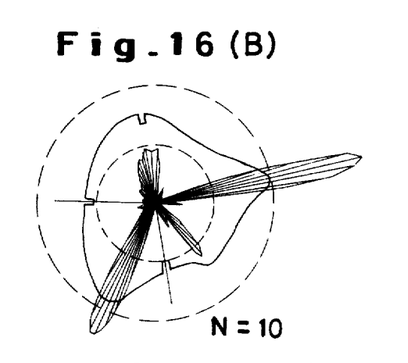

FIG. 16 illustrates feature diagrams of variates obtained of the contour image of the liver of FIG. 14, with slits formed one each at three positions of the contour image to a depth equaling one tenth of the largest of the distances from the fixed point 0 to all the points of intersections with the contour line: FIG. 16(A) representing the diagram involving 1 as the number of N and FIG. 16(B) the diagram involving 10 as the number of N respectively.

Figure 17A:
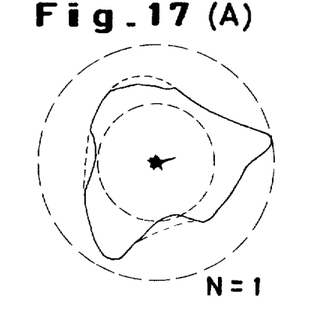
FIG. 17(A) representing the case involving average coordinates of one point on either side of the selected point and FIG. 17(B) the case involving average coordinates of 10 points respectively.
Figure 17B:
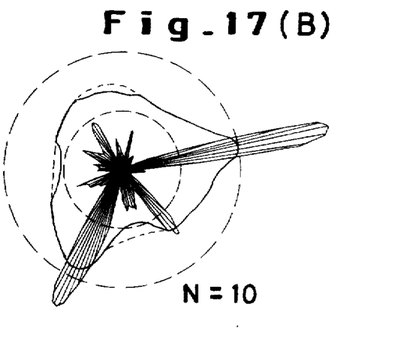

FIG. 17 illustrates feature diagrams of variates obtained of the contour image of FIG. 14, with hollows of a depth equaling one tenth of and a width equaling one fifth of the largest of the distances formed one each at three positions of the contour image: FIG. 17(A) representing the diagram involving 1 as the number of N and FIG. 17(B) the diagram involving 10 as the number of N respectively.

Comparison of the feature diagrams of variates of FIGS. 16(A), (B) with those of FIGS. 14(A), (D) reveals that while the portions missing at the three positions clearly appear at three positions in the variates displayed in FIG. 16(A) as compared with those displayed in FIG. 14(A) where the number of N is 1, the differences between the feature diagram of FIG. 16(B) and that of FIG. 14(D) are conspicuous where the number of N is 10. On the other hand, comparison between the feature diagrams of variates of FIGS. 17(A), (B) and those of FIGS. 14(A), (D) reveals that while the differences between the feature diagram of FIG. 17(A) and that of FIG. 14(A) are not conspicuous where the number of N is 1, the variates in the feature diagram of FIG. 17(B) clearly protrude through the positions corresponding to the missing portions as compared with those in the feature diagram of FIG. 14(D) where the number of N is 10.

From these results of comparison, it is seen that the variates can be conspicuously displayed by setting the value of N at a lower number where changes in the contour have large curvatures and at a higher number where such changes have small curvatures.

As is clear from the detailed description given above, the device of this invention for the extraction of features of a given contour image enables features such as of changes in curvatures of the contour image to be displayed in quite readily discernible conditions by use of a relatively simple construction. A morbid hepatic deformation, therefore, can easily be detected by subjecting the radioisotope image of the liver to processing by use of this device. The device, thus, can be advantageously utilized for the automatic diagnosis of such radioisotope images.

What is claimed is:

1. A device for the extraction of features of a contour image, which comprises:
   (a) means for converting a multiplicity of points set at a fixed, very small interval on the contour line consecutively into coordinates in an x-y coordinate system,
   (b) a first adder for adding the x coordinates of a selected number of points on either side of the first point of said multiplicity of points,
   (c) a second adder for adding the y coordinates of said selected number of points on either side of said first point,
   (d) a first divider for dividing each of the two outputs of said first adder by said selected number,
   (e) a second divider for dividing each of the two outputs of said second adder by said selected number,
   (f) a first subtractor for subtracting the x coordinates of said first point from the first output of said first divider and subtracting said first output from the second output of said first divider,
   (g) a second subtractor for subtracting the first output of said second divider from the second output of said second divider and subtracting said first output of the second divider from the y coordinate of said first point,
   (h) a third divider for dividing the first output of said second subtractor by the second output of said first subtractor,
   (i) a first multiplier for multiplying the first output of said first subtractor by the output of said third divider,
   (j) a third adder for adding the output of said first multiplier and the second output of said second subtractor,
   (k) a first arithmetic means for squaring the output of said third divider,
   (l) a fourth adder for adding the value "1" to the output of said first arithmetic means,
   (m) a second arithmetic means for deriving the square root of the output of said fourth adder,
   (n) a fourth divider for dividing the output of said third adder by the output of said second arithmetic means, and
   (o) display means for displaying the output of said fourth divider.

2. The device according to claim 1, wherein the output of the fourth divider is displayed in the form of a corresponding absolute value.

3. The device according to claim 1, wherein the multiplicity of points set on the contour line are the points at which as many straight lines extended radially from a point fixed within the contour line at a fixed angular interval intersect the contour line.

4. The device according to claim 1, wherein the multiplicity of points set on the contour line are points incrementally separated from one point fixed on the contour line by a fixed, very small interval.

* * * * *